United States Patent [19]
Pedicone et al.

[11] Patent Number: 6,052,757
[45] Date of Patent: Apr. 18, 2000

[54] CONTENT ADDRESSABLE MEMORY FIFO WITH AND WITHOUT PURGING

[75] Inventors: John Thomas Pedicone, Winter Springs; Thomas Andrew Chiacchira; Andres Alvarez, both of Orlando, all of Fla.

[73] Assignee: Real 3D, Inc., Orlando, Fla.

[21] Appl. No.: 08/993,513

[22] Filed: Dec. 18, 1997

[51] Int. Cl.[7] .................................................. G06F 12/00
[52] U.S. Cl. ...................... 711/108; 711/109; 711/154; 711/159
[58] Field of Search .................................. 711/108, 109, 711/154, 155, 159, 217, 218; 710/54, 53

[56] References Cited

U.S. PATENT DOCUMENTS

| | | | |
|---|---|---|---|
| 4,873,665 | 10/1989 | Jiang et al. | 365/154 |
| 5,301,141 | 4/1994 | Traylor | 365/49 |
| 5,438,535 | 8/1995 | Lattibeaudiere | 365/49 |
| 5,513,376 | 4/1996 | Lohmeyer | 395/873 |
| 5,696,930 | 12/1997 | Garetz et al. | 395/435 |

*Primary Examiner*—John W. Cabeca
*Assistant Examiner*—Brian R. Peugh
*Attorney, Agent, or Firm*—Scully, Scott, Murphy & Presser

[57] ABSTRACT

A content-addressable, first-in/first-out memory (CAM-FIFO), as used to provide a read-modify-write buffer for data between two processes, includes: a Content Addressable Memory (CAM) which stores flag data; a FIFO memory portion for providing data storage; a write/read address counting section for providing write/read addresses of data to be stored in/read from the FIFO; and logic to determine and is used to query data on the queue to determine if the FIFO data should still be sent to the receiving process, or replaced with at least part of the flag data.

20 Claims, 6 Drawing Sheets

CONTENT ADDRESSABLE MEMORY FIFO WITH AND WITHOUT PURGING

The present invention relates to data storage apparatus and, more particularly, to a novel content-addressable memory of the First-In/First-Out queue (CAMFIFO) type. This data-storage structure, which can also be called a CAMF, can be implemented in either software or hardware, and has application to computer graphics and more generally to any real-time computer application (such as networking, telecommunications and the like) that requires a read-modify-write process of data on a queue.

BACKGROUND OF THE INVENTION

It is well known to temporarily store data, arriving from one portion of a data processing machine, until that data is needed by a subsequent machine portion; generally, the first item of data received at the temporary memory input is the first item made available at the output. This First-In/First-Out, or FIFO, form of temporary storage is particularly attractive in situations where data at differing clock speeds must be interfaced, or where processing times for each data item may be different, so that the subsequent processor is configured to call for the next data item only when ready, rather than on a clock-only basis. Thus, when the receiving process is not ready for data, the sending process must wait and store data that is ready to be sent. Data transmission between the two processes will resume when the receiving process is ready. If the sending process does not have data to send, the receiving process must wait until data is available.

Figure 1:
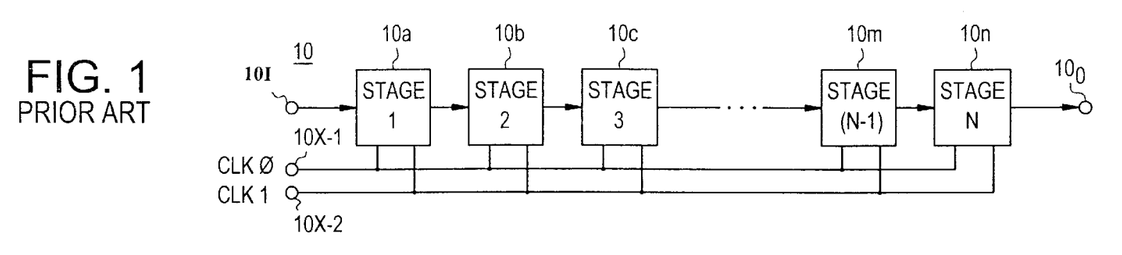
FIG. 1 is a schematic block diagram of a prior-art first-in, first-out memory, and useful in understanding the genesis of the present invention.

Referring to FIG. 1, perhaps the first form of temporary storage of this type may have been a shift register 10, having N plural stages 10a–10n, interconnected so as to facilitate data items, entering an input 10I, shifting though the sequential stages responsive to at least one shift clock signal, until the items appear in the same order at the register output 10o. Of course, those skilled in the art will immediately recognize that many problems will occur with such a simple FIFO, not the least of which is the need for at least two separate clock signals, i.e. an input clock CLK0 at input 10x-1 to shift into storage the new data bit then present at the stage input, after the stored previous data was cleared from that stage by operation of an output clock CLK1 at input 10x-2 to first shift the stored data bit to the output of that stage. This form of FIFO is said to be synchronous, in that all data will be shifted simultaneously; such operation is often not desired.

Figure 1A:
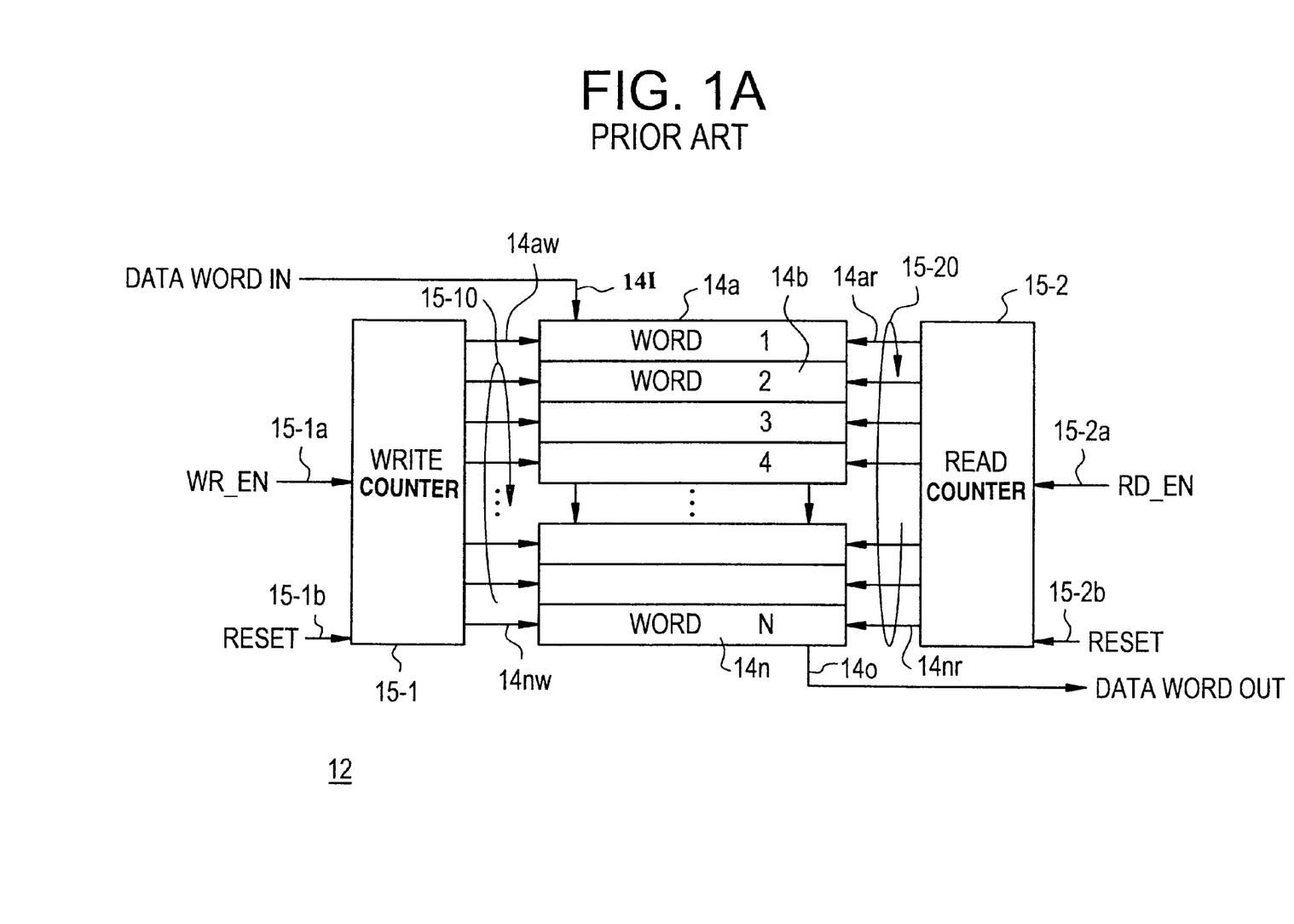
FIGS. 1a and 1b are schematic block diagrams of other prior-art FIFO memories leading to the present invention.

The prior-art FIFO 12 of FIG. 1a solved many of the shift-register-FIFO 10 problems: a stack of N data word registers 14a–14n all receive the incoming data word at common FIFO input port 14I, but only that resistor 14 then enabled by a write signal at its input 14Sw (where S is the stage number A to N) will accept the data word for storage. The write signal is provided at a mutually-exclusive one of the N outputs 15-10 of a write counter means 15-1, which cyclically counts through all N counts, responsive to a write-enable WR_EN signal at input 15-1a. Thus, the rate at which new data words are stored in the unit is governed by the rate of pulsatile signals at input 15-1a; the count can be reset to a preselected state (say, zero) by operation of a reset input 15-1b. All of the N registers 14a–14n have an output connected to a common FIFO output port 14o, but only that stage 14 then enabled by a read signal at its input 14Sr will output its stored data word for subsequent use. The read signal is provided at a mutually-exclusive one of the N outputs 15-20 of a read counter means 15-2, which cyclically counts though all N counts, responsive to a separate read-enable RD_EN signal at input 15-2a. Thus, the rate at which stored data words are output from unit 12 is governed by the rate of pulsatile signals at input 15-2a; this count can also be reset to a preselected state (say, zero) by operation of its independent reset input 15-2b. If the WR_EN signal at input 15-1a is different from the RD_EN signal at input 15-2a, the FIFO can input and output data words upon occurrence of different events and at different frequencies. Those skilled in the art will recognize that while FIFO 12 solves some of the register 10 problems, there are still problems, such as overflow, underflow, and the like, with FIFO 12.

Figure 1B:
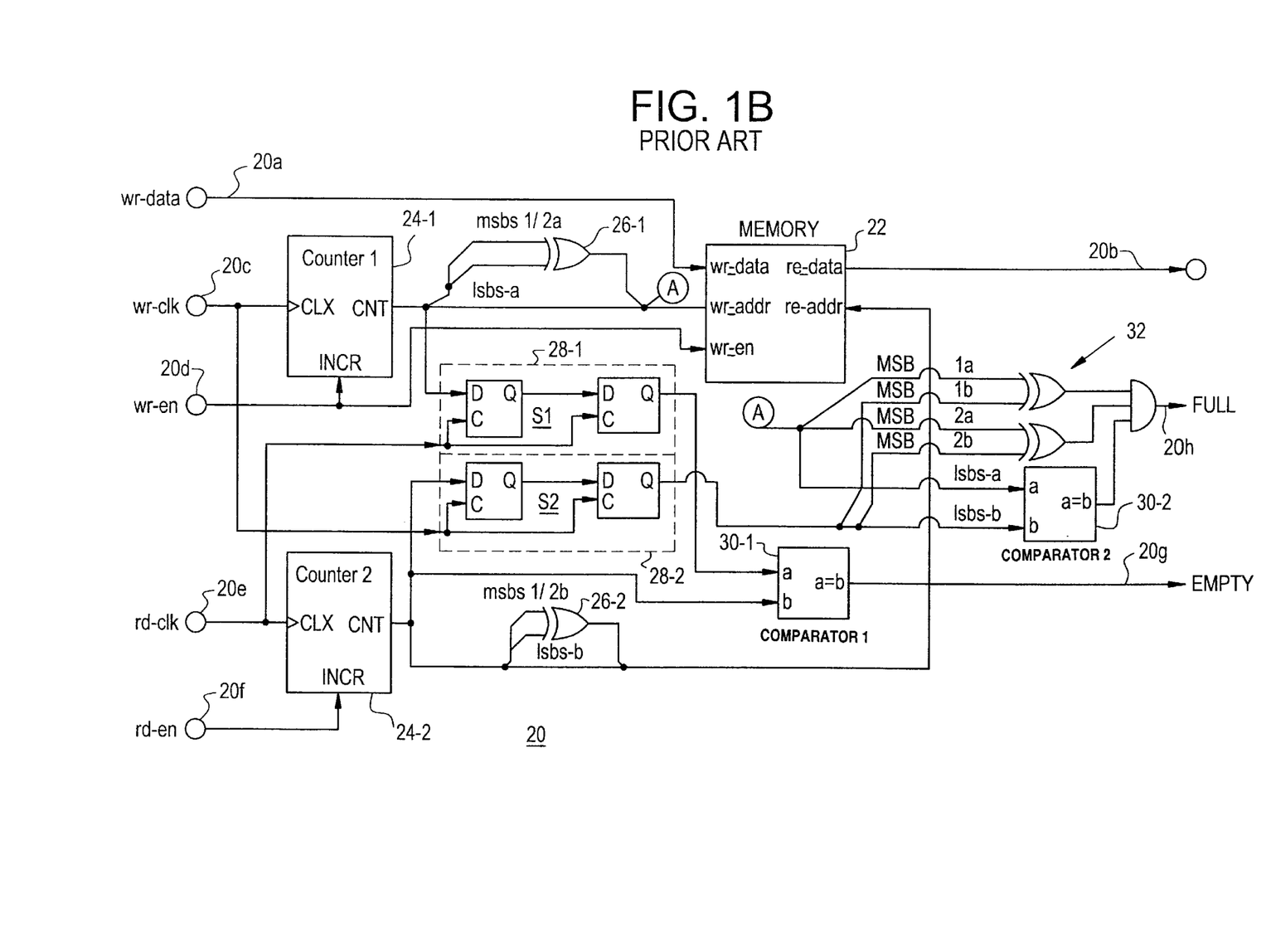

Another prior-art FIFO 20 (FIG. 1b) solves most of these problems. In FIFO 20, a multi-dataword storage memory means 22 will store a new data word, input at FIFO input port 20a, responsive to the presence of both a write clock wr-clk signal at input 20c and a write-enable wr-en signal at input 20d; the pair of signals advances the count in a first counter means 24-1, which count is coupled (via a first exclusive-OR gate 26-1 acting on the two most significant address bits (MSBs 1&2)) via bus A, to the wr-addr input of the memory means 22. A first synchronizer means 28-1, comprised of a pair of type-D flip-flops, also receives the first counter means 24-1 output data. The data words stored in memory 22 are individually read to means output 20b responsive to the presence of a cyclic read address rd-addr signal, from the output bus of another counter means 24-2, which is cyclically provided responsive to a read clock rd-clk signal at an input 20e and a read enable rd-en signal at an input 20f. The second counter output bus is also connected to another synchronizer means 28-2. A first comparator means 30-1 receives the first synchronizer output and the second counter means output to determine if the memory is empty, and responsively provides a suitable signal at output 20g. A second comparator means 30-2 as well as gating logic means 32 acts upon the second synchronizer output and the first counter means output to determine if the FIFO memory means 22 is full; output 20h is enabled when the FIFO is full, so that further data input can be temporarily suspended.

The memories described hereinabove are useful, but all have some form of shortcoming. Even the synchronized FIFO of FIG. 1b, while solving many of the prior problems, still does not allow the content of any temporarily-stored dataword to be accessed and/or be altered while the queue of words is in storage; these features are often desirable. Accordingly, we desire to provide a FIFO in which the contents of any stored dataword can be addressed, accessed and changed or removed, if desired, without changing the first-in, first-out basic operation of the memory.

BRIEF SUMMARY OF THE INVENTION

In accordance with the invention, a content-addressable memory first-in, first-out means (CAM-FIFO), as used to provide a read-modify-write buffer for data between two processes, includes: a Content Addressable Memory (CAM) which is used to query data on the queue to determine if the data should still be sent to the receiving process, with the decision to send data being based on the data in the queue and on other real-time data externally introduced to the CAMFIFO; a FIFO means (implementable with registers, memory or a data structure in software) for providing data storage; and counting means for providing write/read addresses of data to be stored in/read from the FIFO.

In one presently preferred embodiment, the FIFO stores data and flag information. A write- address (wr_addr) is used to write the incoming FIFO. In data words into the FIFO and is incremented (the write pointer is advanced) when a write-enable wr_en signal is set high. A read address (rd_addr) determines which location in the array is read out to a FIFOOut data output port. The rd_addr address is incremented when a read-enable rd_en signal is set high. Each flag dataword of a set of InFlag data indicates the status of the data being written into the FIFO. These flags can be modified based on other real-time data after the flags have been entered into the queue. The status of these flags at the output of the FIFO determines if data will be sent to the receiving process at all or if the data must be held until the output flags change state.

The CAM structure can be implemented using comparators and multiplexers. In this respect, 'Content Addressable' signifies that a portion of the content stored in the memory is used to determine which data will be accessed during a read operation. This data, which in a sense acts as an address, is called the Tag. The CAM can be read via enablement of a CamReadAddr signal, which is compared with the tag data stored at all of the data locations in the register array. If a Match occurs, a Hit flag is set high and the data, from the first location in the array storing a Tag which matched the CamReadAddr, is output via another multiplexer to a CamData output port. The CamData is used by a sending process to perform tests to determine if the data in the queue should still be sent to the main output port. The sending process must alter a FlagCtrl data word in order to modify either the datawords or the status flag words in the queue. The flags and/or data words stored at the Hit FIFO location may be modified based on the contents of the received FlagCtrl data word and the stored FIFO data.

Accordingly, it is an object of the present invention to provide a novel CAMFIFO structure and a novel method of operation of such content-addressable memory operation, to realize the forgoing described benefits.

This and other objects of the present invention will become apparent to those skilled in the art, upon a reading of the following detailed description of one presently preferred embodiment, when considered in conjunction with the associated drawing, in which like reference designations are used to refer to like elements.

DETAILED DESCRIPTION OF THE INVENTION

Figure 2A:
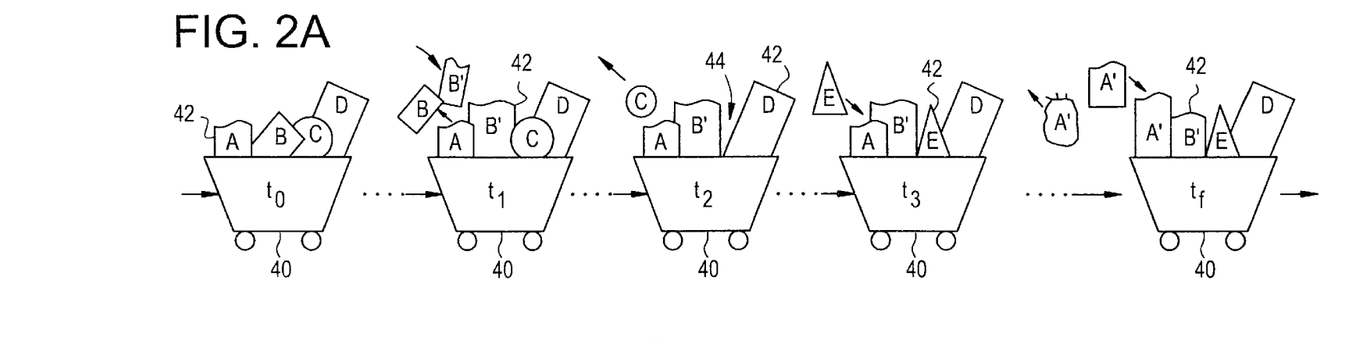
FIG. 2a is a graphical illustration of an analogy describing the desired operation of the present invention, and useful in forming an appreciation of the operational characteristics thereof.

Referring initially to FIG. 2a, the CAMFIFO of the present invention can be analogized to a storage means 40 (e.g. a shopping basket) in which several datawords 42 (e.g. items A, B, C and D) have been sequentially received from a previous source/process and are at present at some time $t_0$ as a queue of ordered items ABCD. If no action is taken, the stored items will be, in manner well known to the art, sequentially output to a subsequent receiving modality/ process (e.g. will be removed from the shopping cart at the check-out counter) in order ABCD starting at a finish time $t_f$.

In accordance with one aspect of the invention, at some time $t_1$ after the datawords 42 are placed in the FIFO storage memory, an externally-provided first request can be received, the memory contents searched for a match to the request contents and, once the request is matched to a particular stored item, that item can be acted upon (changed or deleted) without losing its place in the queue. Thus, in the shopping cart analogy, at time $t_1$, a request is made by the shopper's child to change the breakfast cereal (item B) to another cereal B'; once the proper location of B is ascertained, the space occupied by item B remains, but the contents of that space is changed from B to B' (by removal of B and substitution therefore by a new item B' brought in from outside the memory-analogy shopping cart), responsive to the change request. The ordered contents of the FIFO cart 40 at time $t_1$ is now AB'CD.

At a subsequent time $t_2$, a new external request is received for deletion of the contents of the item (package C) stored at another location 44; the locations are searched to find a corresponding item C, and the item is removed, leaving an empty location 44. The FIFO cart 40 now has ordered contents AB'_D at time $t_2$, where the underlined space_ indicates that an extraneous dataword is present, with content that is immaterial to the end user.

At a later time $t_3$, a third externally-provided request is received, to place a new dataword (item E) in the location previously occupied by deleted dataword C; the item E is placed in the shopping cart queue, which is now ordered AB'ED.

Other changes and removals can be made, up until the particular item/dataword is output from the queue. Thus, a last request can command the change of item A to item A', which is done at time $t_f$ (say, just before the cashier rings up the purchase of item A, which is swapped for new item A'); dataword A' is the one actually output to the subsequent process and the queue advances to ready the next dataword (B') for output, to be followed by dataword E then D, and so forth.

Figure 2B:
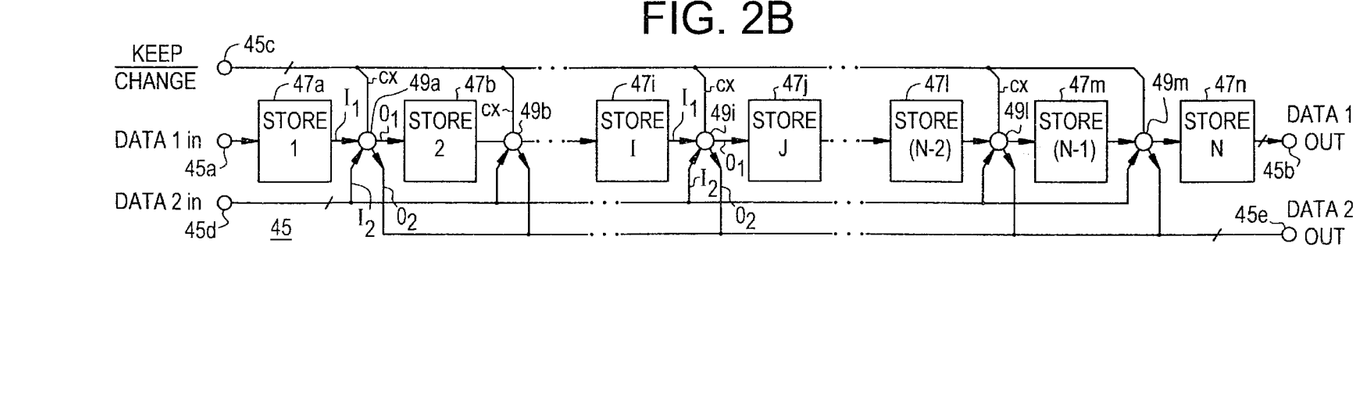
FIG. 2b is a schematic block diagram of the basic CAM-FIFO form of operation to be realized by the present invention.

Referring now to FIG. 2b, one general form 45 of a CAMFIFO is shown in block schematic form. The datawords from the source process enter through a first data input port 45a and are each initially stored in a first store means 47a, which is one of a plurality N of such store means 47; the last storage stage 47n provides its output to a first data output port 45b. As each dataword sequentially moves through stages 47a–47n, responsive to clock and the like signals not shown but easily identifiable by those skilled in the art, a decisional process is provided by a switching means 49 controlled by a common control, or keep/change, data input port 45c, and positioned after each of the first (N−1) stages (i.e. the i-th means 49i, where a=1≦i≦m=n−1, is located between the i-th store means 47i output and the next j-th=i-th+1 stage store means 47j input). Each means 49 has plural data path inputs (e.g. a first input I1 connected to the output of the previous storage stage and a second input I2 connected to a common bus from a second databus input 45d) and can have plural data path outputs (e.g. a first output O1 connected to the input of the next storage stage and a second output O2 connected to a second databus output port 45e), with the connection of any selectable X input Ix to any selectable Y output Oy being controlled by the dataword presented at the CX control input, and received from the control port 45c bus.

In operation, CAMFIFO 45 may be envisioned as having, at some time, each of a sequence of datawords stored in an associated one of stages 47; a first-entered dataword, now stored in the last (store N) stage 47n, is output to port 45b. At this time, suppose that the contents of all stages 47a through 47m are to be kept as presently stored; a KEEP command is thus provided to port 45c by external decision means (not shown). The switch means 49 (which may be common multiplexer MUX means and the like) receive a no-change command and the main input I1 is connected to the main output O1. The contents of each stage can now be moved forward, to the next sequential stage, without change. However, if the dataword provided at input port 45c includes a CHANGE command, as well as specifying a particular stage whose content is to be changed, a specific dataword to be found and changed, or a similar selected condition on which to base a commanded change, the contents of at least one stage can be changed, responsive to that command. Typically, the command at port 45c will include data sufficient to select one stage (say, stage I) whose stored contents is to be changed when the next register data shift occurs; responsive to that command, the stage I associated switching means 49i receives the CHANGE input, reconnecting the main output O1 to the auxiliary input I2, itself connected to the second data input port 45d, so that a new dataword as provided at input 45d is then stored in the subsequent j-th stage 47j in place of the old dataword which was just transferred from stage 47i. Advantageously, the i-th stage dataword appears at main input I1 and is connected to an auxiliary output O2 and thence to the auxiliary output port 45e, to cause the presently stored i-th stage dataword to exit via port 45e. Each stage contents can thus be substituted for; if a status flag is included in the stage dataword, it can be changed to indicate the state of the contents (including the use of such flag data as, for example, an "ignore" flag, if the stage content is to be considered a nullity or "don't care" data).

Figure 3A:
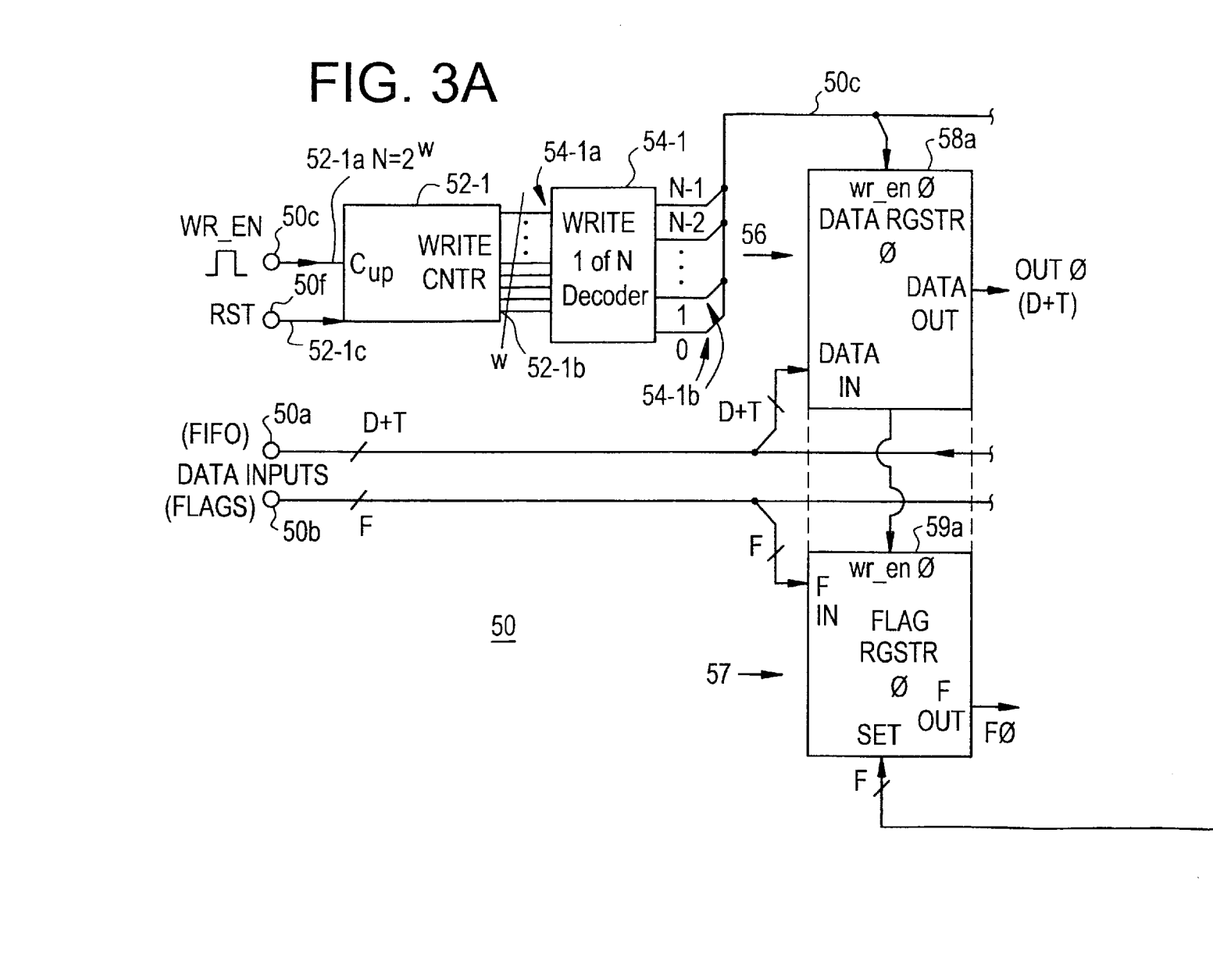
FIG. 3 is a schematic block diagram of a presently preferred CAMFIFO in accordance with the invention.
Figure 3B:
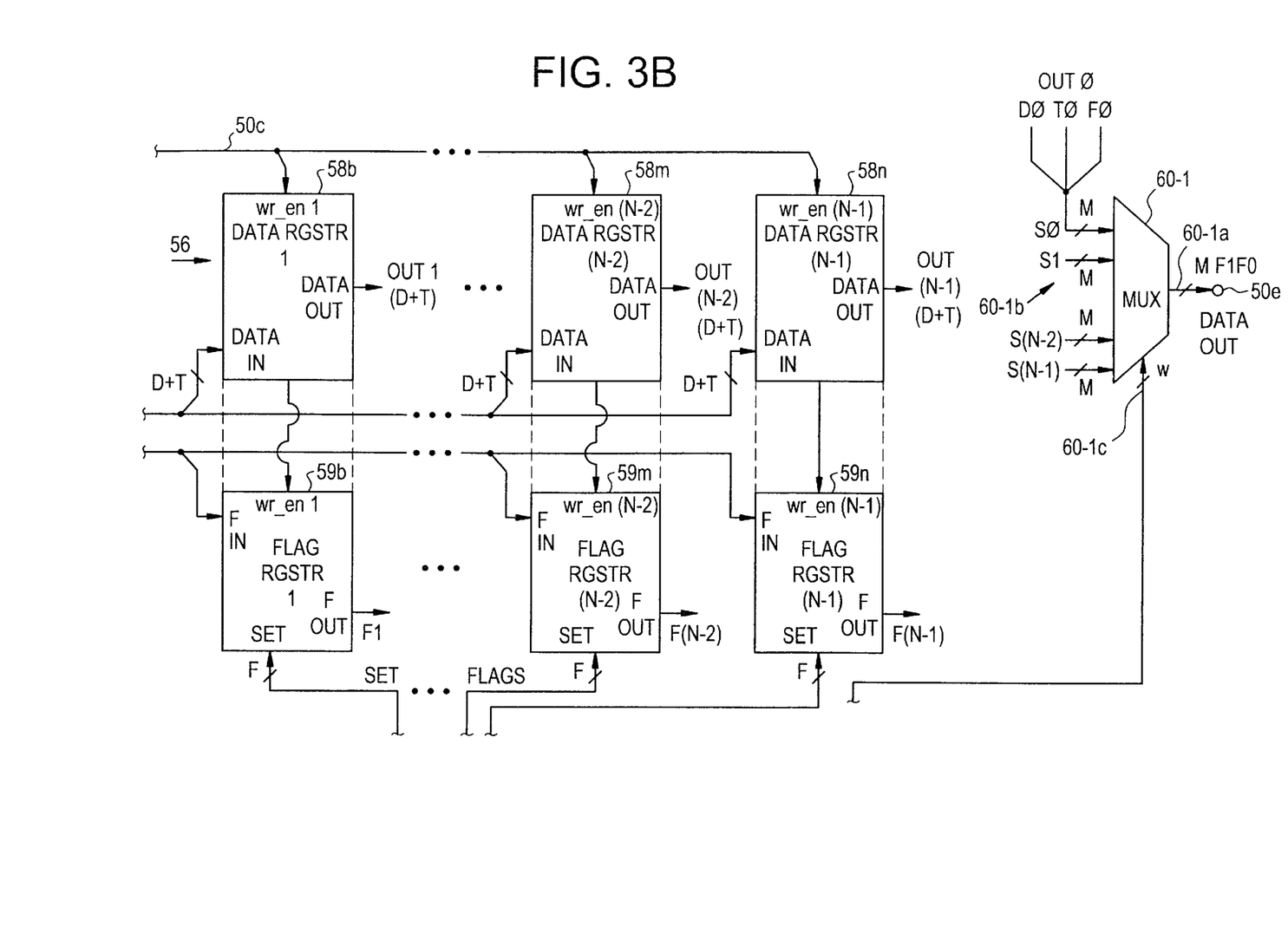
Figure 3C:
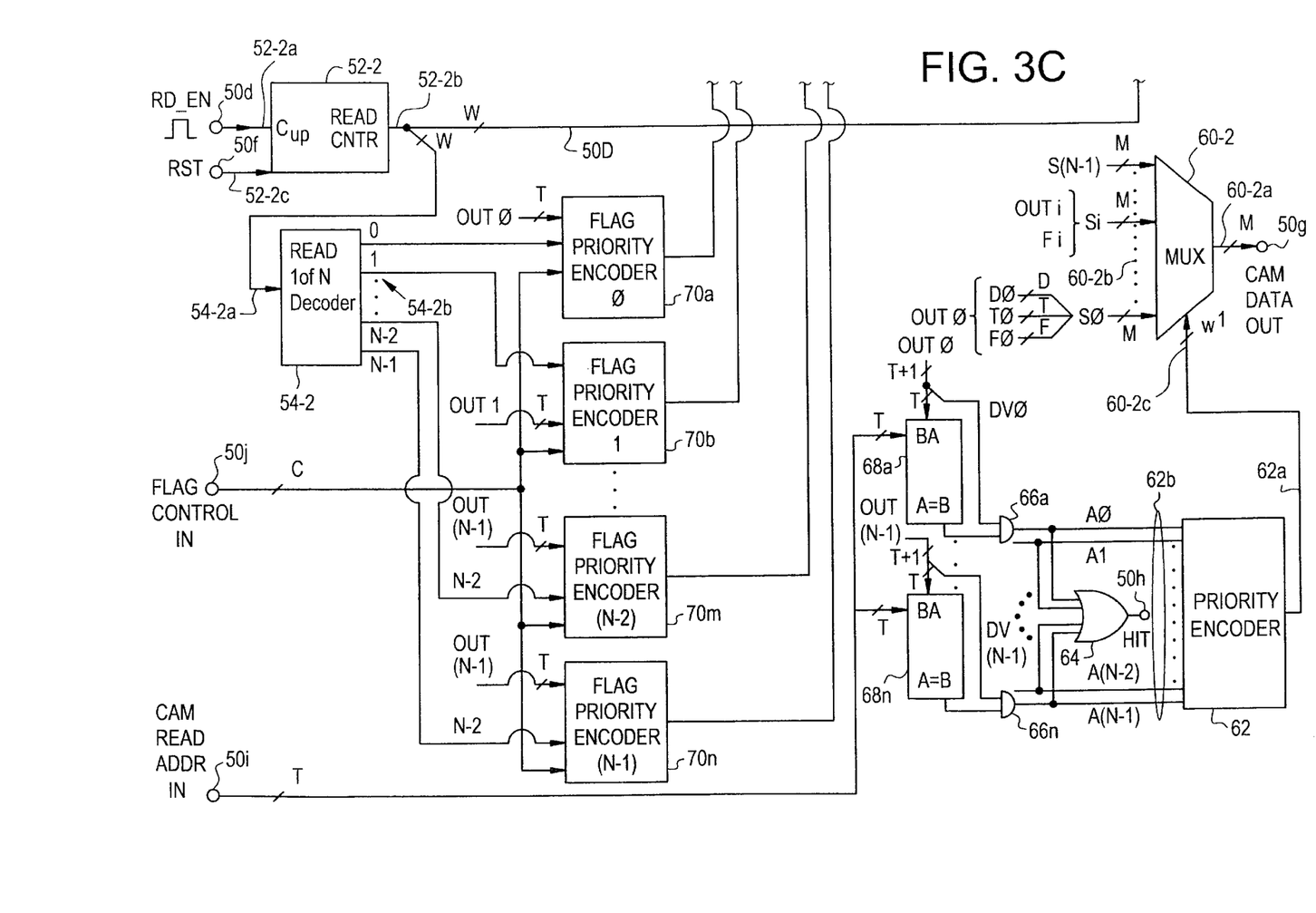

Referring now to FIG. 3, our presently preferred CAMFIFO 50 has: a FIFO main dataword input port 50a, receiving a D-bit FIFOIN data word along with a T-bit Tag dataword, for D+T bits of parallel data; a Flags dataword input port 50b receiving F bits of parallel data; a write-enable wr_en signal input 50c for receiving an external signal indicating that a new dataword (present at input 50a) requires storage; a read-enable rd_en signal input 50d for receiving an external signal indicating that a stored dataword (at least some of which D+T+F=M bits of data are presently stored in the next-numbered storage-stage to which a read counter will be set by the rd_en signal pulse) should be output via a main, or FIFO data, output port 50e; a reset RST signal input 50f; and an auxiliary, or CAM data, output port 50g for providing another M-bit dataword. A HIT output 50h provides a logic signal on inputs 52-1c and 52-2c, respectively which may be utilized as explained hereinbelow; a T-bit input port 50i receives a CAM-Read_Addr (CRA) dataword; and a separate C-bit input port 50j receives a flag control dataword.

A write-address counter means 52-1 and a read-address counter means 52-2 each receive the input 50f reset signal, and are reset to a preselected initial count thereby; thereafter, the count in each counter is independently incremented responsive to receipt of an associated one of the wr_en signal at counter input 52-1a connected to input 50c or the rd_en signal at counter input 52-2a connected to input 50d. Each counter 52 counts through N states, where N is the depth of the CAMFIFO; advantageously, binary counters and decoders are used, so that $N=2^W$, where W is an integer (e.g.if W=5, N=32) and is also the number of output lines 52-1b and 52-2b, and inputs 54-1a and 54-2a.

A FIFO memory means 56 operates in conjunction with a CAM means 57. FIFO means 56 uses N stages 58a–58n of dataword register means 58; CAM means 57 uses N stages 59a–59n of Flag register means 59. Each of stages 58 has a data DATA IN input, of depth D+T bits, connected to a data bus 50A, for storing (responsive to a wr_en-i signal, where 1≤i≤n) the FIFO data and Tag data received from input 50a. Similarly, each of stages 59 has a flags F IN input, of F bits depth, connected to a data bus 50B, and operates to store the FLAGS data received from input 50b. The FIFO data then at input 50a and the flag data then at input 50b are simultaneously entered into the data stage 58i and the associated flag stage 59i, responsive to the receipt of the enabling logic signal at the i-th stage wr_en_i input, from a write-enable bus 50C; the wr_en_i signal originates at the associated i-th one of the outputs 54-1b of decoder means 54-1. Each j-th one of stages 58 has a data DATA OUT output Outj (where 0≤j≤(N−1)), each including the D data bits (Dj) and T tag bits (Tj) for that stage. A first N-input multiplexer means 60-1 has an output 60-1a, coupled to output 50e, at which appears the set Sj of the FIFO+FLAG data from an associated input 60-1b, under control of a W-bit control word provided at a read-control input 60-1c; the M bits of each data line set Sj includes the FIFO outputs OUTj datalines (of bits Dj+Tj) and the j-th flag register stage 59j output bits Fj datalines. Similarly, a second N-input multiplexer means 60-2 has an output 60-2a, coupled to output 50g, at which appears the data set Sj from an associated input 60-2b, under control of a W'-bit control word provided at a read-control input 60-2c. It will be seen that main input 50a and auxiliary input 50b are analogous to the first and second data inputs 45a and 45d, respectively, of the CAMF of FIG. 2b, while main output 50e and auxiliary output 50g are analogous to first and second outputs 45b and 45e, respectively.

The CAM DATA output selection is controlled by the W' data at the output 62a of an N-bit encoder means 62, receiving N different signals A0 through A(N−1) at its inputs 62b. Each of logic signals Aj is also provided to a N-input OR gating means 64, which provides the HIT signal at output 50h if any one line Aj is enabled. The logic state of each line Aj is determined by an associated 2-input AND gate 66a–66n; one input of each gate 66j is connected to an equality output of an associated one 68j of equality logic means 68a–68n, and the other gate input is connected to a data-valid signal DVj from the associated OUTj datalines. Each equality logic means 68j has a first A input receiving the tag Tj bits from the OUTj outputs of the FIFO stage 58j, and a second B input receiving the T bits of the CRA dataword from input 50i. The A=B output of any one logic means 68 is enabled only if the exact data sequence on the T lines of the A input is duplicated on the T lines of the B input, indicating that the tag contents of the selected j-th FIFO stage is identical with the CAM read-address (CRA) provided at input 50i. It will be seen that CAMFIFO 50 can only receive one address at a time for the content-addressable tag, and that at least one addressed stage(s) will set the CRA word to the B inputs of all equality means 68; if there is a tag content match at all, then only one means 68 will thus have an A=B output logic-high enablement (conversely, if there is no match, because the CRA bits request a tag content not presently found in any stage, then all means 68 outputs are disabled, or logic-low, and there is no HIT output as are all gates 66 have disabled outputs).

The j-th one 70j of the plurality 70a–70n of flag priority encoders 70 receive the stage i read enable data from decoder 54-2 outputs 54-2b and output data set OUTj containing the data D bits, tag T bits and flag F bits. Encoders 70 are used to determine whether the contents of an individual stage 0 through (N−1) is changed, via the F bits of new Flag Set data which can be transmitted into the j-th stage of CAM means 57, or maintained as originally input. If the state of the flag bits meet the required states for outputting the data, then both the original D bits of data and the F bits of flags data will be output at main port 50e when the read pointer is set to read out the contents of that stage. If the flag states are changed to a non-output state, then the data in the data and flag registers of the same stage are held at port 50e and the FIFO stage 58j data will generally be ignored by the subsequent process, as the companion flag data indicates an 'ignore' condition.

In a CAMF 50 without purging, data contained in FIFO portion 56 will be ignored by a subsequent receiving process if status flags indicate that the data then being sent through output port 50e should be omitted from the output data stream. This decision can be made on each set of data passed through FIFO output port 50e, because all data stored in means 56 is output, even if never used by the receiving process; throughput decreases if a large portion of the data is designated as 'not valid'.

In order to increase throughput for the CAMF, when much of the data in the queue becomes invalid, the data should be purged, or removed, from the output data stream. The data removal can be accomplished either through some form of register shifting or, in the simplest approach, by advancing the read pointer count, at output 52-2b, past any invalid data; this action purges the output data stream of all unwanted data and enables the sending process to operate at the maximum rate possible—this is a CAMF with purging.

While the present invention has been described with respect to one presently preferred embodiment thereof, many modifications and variations will now become apparent to those skilled in the art. It is our intent therefore to be limited only by the scope of the appending claims and not by way of any details or instrumentalities set forth by way or explanation herein.

What we claim is:

1. A content-addressable, first-in/first-out data storage memory, comprising:

memory means having a plurality of stages each for storing a dataword input to that stage;

a plurality of input port means, each of a first one of such input port means for receiving a next sequential one of a plurality of datawords output from one of said stages;

selection means, each interposed between successive pairs of stages in said memory means and responsive to the contents of a command dataword, for providing to a next stage of the stage pair a dataword received from a selected one of a set of (a) an output of the previous stage of the stage pair, and (b) a remainder of the plurality of input port means other than said first input port means; and output port means for transmitting out of said memory the dataword stored in a last one of said memory means stages.

2. The memory of claim 1, further comprising at least one additional output port means each for transmitting from said memory a dataword from a selected one of said stages, other than said last one of said stages.

3. The memory of claim 2, wherein each of said selection means operates for connecting each selected one of a plurality of inputs, one of which receives the dataword stored in a first one of the associated stages of the pair, to an associated selected one of a plurality of outputs, one of which provides datawords to a remaining one of the pair of stages.

4. The memory of claim 3, wherein the connection of each input/output pair, comprised of a selected one input to a selected one output, is controlled responsive to the contents of said command dataword.

5. The memory of claim 4, wherein said command dataword is provided from a source external to said memory.

6. The memory of claim 1, wherein each of said selection means operates for connecting a selected one of a plurality of inputs, one of which receives the dataword stored in a first one of the associated stages of the pair, to an output which provides datawords to a remaining one of the pair of stages.

7. The memory of claim 6, wherein the connection of a selected one input to said output is controlled responsive to the contents of said command dataword.

8. The memory of claim 7, wherein said command dataword is provided from a source external to said memory.

9. The memory of claim 1, wherein the contents of any memory stage can be effectively set to a nullity responsive to said command dataword.

10. A content-addressable, first-in/first-out memory (CAM-FIFO), for providing a write-modify-read buffer for data being sent from a source process to a receiving process, comprising:

first-in-first-out (FIFO) memory means for storing at an associated location in a first queue each different one of a first plurality of first-kind datawords;

content-addressable-memory (CAM) means for storing at an associated location in a second queue each different one of a second plurality of second-kind datawords;

write address counting means for providing in each queue an address of a sequence of first and second locations at which a next-received pair of said first-kind and second-kind datawords, received from the source process, are to be stored;

read address counting means for providing an address from which a next one of said first-kind datawords is to be output to said receiving process; and logic means for determining if the first-kind dataword stored in any FIFO location should be replaced with at least part of a selected second-kind dataword prior to that FIFO location contents being output to said receiving process.

11. The memory of claim 10, wherein said logic means includes means for receiving an external command for selection and replacement of a first-kind dataword.

12. The memory of claim 11, wherein all FIFO locations are checked by said logic means and the first-kind dataword is replaced only at a first-encountered FIFO location.

13. The memory of claim 11, wherein said logic means includes means for storing at a specific location an external command requiring said receiving process to disregard an associated first-kind dataword.

14. The memory of claim 13, wherein the FIFO locations to be disregarded are purged responsive to the external command.

15. The memory of claim 13, wherein the FIFO locations to be disregarded are not purged responsive to the external command.

16. A method for write-modify-read buffer storing of data being sent from a source process to a receiving process, comprising the steps of:

(a) storing at an associated FIFO location in a first queue each different one of a first plurality of first-kind datawords;
(b) storing at an associated location in a second queue each different one of a second plurality of second-kind datawords;
(c) providing in each queue an address of a sequence of first and second locations at which a next-received pair of said first-kind and second-kind datawords, received from the source process, are to be stored;
(d) providing an address from which a next one of said first-kind datawords is to be output to said receiving process; and
(e) determining if the first-kind dataword stored in any first-queue location should be replaced with at least part of a selected second-kind dataword prior to that first-queue location contents being output to said receiving process.

17. The method of claim 16, wherein step (e) includes the step of receiving an external command for selection and replacement of a first-kind dataword.

18. The method of claim 16, wherein step (e) includes the step of storing at a specific location an external command requiring said receiving process to disregard an associated first-kind dataword.

19. The method of claim 18, further including the step of purging the contents of each FIFO location to be disregarded responsive to the external command.

20. The method of claim 18, further including the step of maintaining the contents of each FIFO location to be disregarded responsive to the external command.

* * * * *